US012657361B1

(12) United States Patent
Pawar

(10) Patent No.: US 12,657,361 B1
(45) Date of Patent: Jun. 16, 2026

(54) PRESERVING SWITCHING ACTIVITY DURING INTEGRATED CIRCUIT OPTIMIZATION

(71) Applicant: Synopsys, Inc., Mountain View, CA (US)

(72) Inventor: Kailash Pawar, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 745 days.

(21) Appl. No.: 18/157,021

(22) Filed: Jan. 19, 2023

Related U.S. Application Data

(60) Provisional application No. 63/301,851, filed on Jan. 21, 2022.

(51) Int. Cl.
*G06F 30/327* (2020.01)
*G06F 119/06* (2020.01)

(52) U.S. Cl.
CPC ........ *G06F 30/327* (2020.01); *G06F 2119/06* (2020.01)

(58) Field of Classification Search
CPC ........ G06F 30/30; G06F 30/327; G06F 30/32; G06F 30/33; G06F 30/3312; G06F 30/337; G06F 30/343; G06F 30/35; G06F 30/3315; G06F 2119/06

USPC ........................................................ 716/100
See application file for complete search history.

(56) References Cited

U.S. PATENT DOCUMENTS

| | | | | |
|---|---|---|---|---|
| 2008/0301606 A1* | 12/2008 | Law | ........................... | G06F 1/08 |
| | | | | 716/113 |
| 2009/0271167 A1* | 10/2009 | Zhu | ........................ | G06F 30/331 |
| | | | | 703/14 |
| 2011/0218779 A1* | 9/2011 | Palisetti | ................. | G06F 1/3203 |
| | | | | 703/2 |
| 2018/0026613 A1* | 1/2018 | Zyuban | ................... | H03K 5/131 |
| | | | | 327/277 |

* cited by examiner

*Primary Examiner* — Paul Dinh
(74) *Attorney, Agent, or Firm* — Lowenstein Sandler LLP

(57) ABSTRACT

An initial polarity associated with an element of an integrated circuit design is determined. Responsive to a determination that an optimization process associated with the integrated circuit design is completed, a current polarity associated with the element is determined. A determination is made that a signal is to be applied at the element based on activity data associated with the integrated circuit design. The signal is associated with a first activity. Responsive to a determination that the current polarity associated with the element does not correspond to the initial polarity associated with the element, the single applied to the element is inverted. The inverted signal is associated with a second activity that is inverted from the first activity.

20 Claims, 8 Drawing Sheets

600

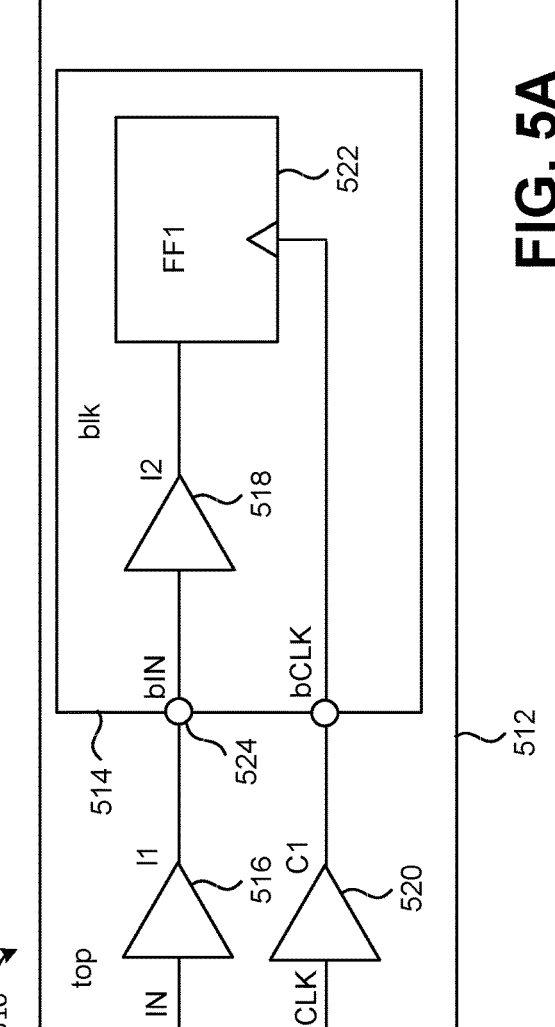

FIG. 5A

| Polarity Map 530A | |
| --- | --- |
| IN | P: positive |
| I1/A | P: positive |
| I1/Y | P: positive |
| top/bIN | P: positive |
| top/blk/I2/A | P: positive |
| top/blk/I2/Y | P: positive |
| top/blk/FF1/D | P: positive |

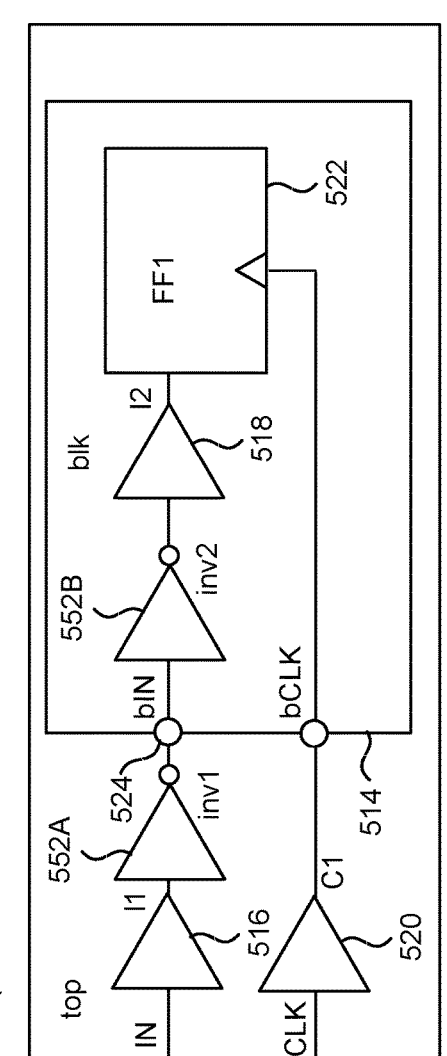

FIG. 5B

| Polarity Map 530B | |
| --- | --- |
| IN | P: positive |
| I1/A | P: positive |
| I1/Y | P: positive |
| inv1/A | P: negative |
| inv1/Y | P: negative |
| top/bIN | P: negative |
| inv2/A | P: negative |
| inv2/Y | P: positive |
| top/blk/I2/A | P: positive |
| top/blk/I2/Y | P: positive |
| top/blk/FF1/D | P: positive |

600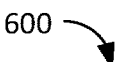

```
┌─────────────────────────────────────────────────────────┐
│   Determine an initial polarity associated with an       │
│   element of an integrated circuit design 610            │
└─────────────────────────────────────────────────────────┘
                         │
                         ▼
┌─────────────────────────────────────────────────────────┐
│   Determine that a process associated with improving     │
│   at least one of a function or a performance of the     │
│   integrated circuit design has completed 612            │
└─────────────────────────────────────────────────────────┘
                         │
                         ▼
┌─────────────────────────────────────────────────────────┐
│   Determine a current polarity associated with the       │
│   element 614                                            │
└─────────────────────────────────────────────────────────┘
                         │
                         ▼
┌─────────────────────────────────────────────────────────┐
│   Determine, based on activity data associated with the  │
│   integrated circuit design, that a signal associated    │
│   with a first activity is to be applied at the          │
│   element 616                                            │
└─────────────────────────────────────────────────────────┘
```

Current polarity correspond to initial polarity? 618

Maintain the signal applied to the element 620

Invert the signal applied to the element 622

FIG. 6

PRESERVING SWITCHING ACTIVITY DURING INTEGRATED CIRCUIT OPTIMIZATION

RELATED APPLICATIONS

This application claims the benefit of U.S. Provisional Patent Application No. 63/301,851, filed Jan. 21, 2022, the entire contents of which are hereby incorporated by reference herein.

TECHNICAL FIELD

The present disclosure relates to the field of integrated circuit design, and in particular, to preserving switching activity during integrate circuit optimization.

BACKGROUND

An integrated circuit may be optimized to reduce the amount of power (e.g., static power, dynamic power, etc.) consumed at the integrated circuit. The amount of dynamic power consumed at an integrated circuit can be dependent on a switching activity of elements of the integrated circuit. Switching activity refers to the measurement of changes in signal values (e.g., from '0' to '1,' from '1' to '0,' etc.) at a respective element. Switching activity data may not be available for an integrated circuit during the design and/or optimization phase of the development process. Accordingly, it can be difficult for designers and/or engineers to optimize the integrated circuit to reduce dynamic power consumption.

SUMMARY

In one or more embodiments, a processing device determines an initial polarity associated with an element of an integrated circuit design. Responsive to determining that a process associated with improving at least one of a function or a performance of the integrated circuit design has completed, the processing device determines a current polarity associated with the element. The processing device determines, based on activity data associated with the integrated circuit design, that a signal is to be applied at the element, where the signal is associated with a first activity. Responsive to determining that the current polarity associated with the element does not correspond to the initial polarity associated with the element, the processing device inverts the signal applied to the element. The inverted signal is associated with a second activity that is inverted from the first activity.

In one or more embodiments a system includes a memory storing instruction and a processor coupled with the memory to execute the instructions. The instructions, when executed, cause the processor to determine an initial polarity associated with an element of an integrated circuit design. The instructions further cause the processor to responsive to determining that a process associated with improving at least one of a function or a performance of the integrated circuit design has completed, determine a current polarity associated with the element. The instructions further cause the processor to determine, based on activity data associated with the integrated circuit design, that a signal is to be applied at the element, wherein the signal is associated with a first activity. The instructions further cause the processor to responsive to determining that the current polarity associated with the element does not correspond to the initial polarity associated with the element, invert the signal applied to the element. The inverted signal is associated with a second activity that is inverted from the first activity.

In one or more embodiments, a non-transitory computer readable medium includes stored instruction, which when executed by a processor, cause the processor to cause the processor to determine an initial polarity associated with an element of an integrated circuit design. The instructions further cause the processor to responsive to determining that a process associated with improving at least one of a function or a performance of the integrated circuit design has completed, determine a current polarity associated with the element. The instructions further cause the processor to determine, based on activity data associated with the integrated circuit design, that a signal is to be applied at the element, wherein the signal is associated with a first activity. The instructions further cause the processor to responsive to determining that the current polarity associated with the element does not correspond to the initial polarity associated with the element, invert the signal applied to the element. The inverted signal is associated with a second activity that is inverted from the first activity.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 5A and 5B illustrate example polarity maps for an integrated circuit design, in accordance with some embodiments of the present disclosure.

FIG. 6 is a flow diagram illustrating an example method for preserving switching activity during integrated circuit optimization, in accordance with some embodiments of the present disclosure.

DETAILED DESCRIPTION

Figure 1:
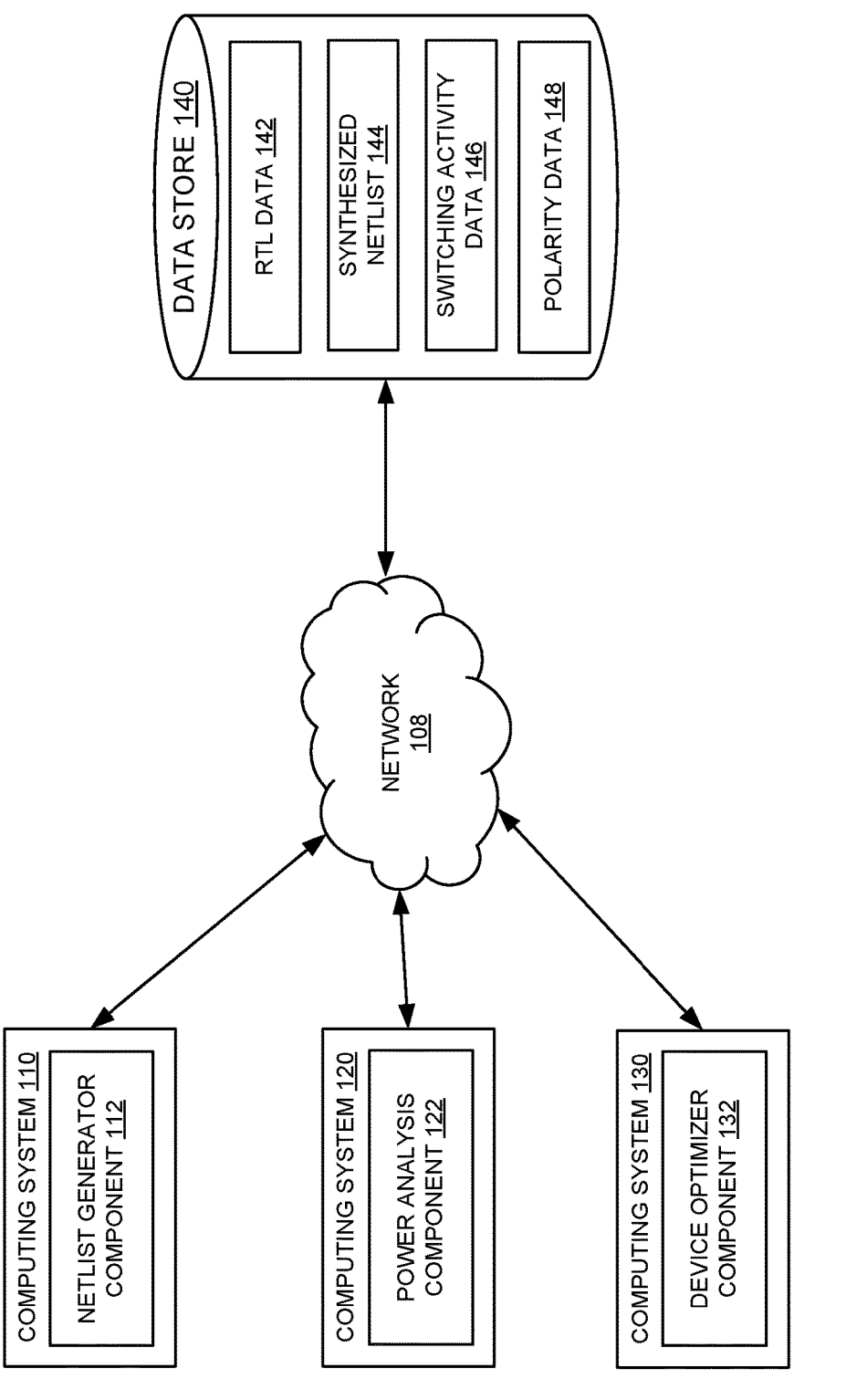
FIG. 1 illustrates an example system architecture, in accordance with some embodiments of the present disclosure.

Designers and/or engineers may employ one or more different analyses (e.g., a timing analysis, a power analysis, etc.) in optimizing the design of an integrated circuit (IC). A power analysis involves computing or otherwise estimating the consumption of power (e.g., static power, dynamic power, etc.) at the IC. In some instances, power consumption can be measured by switching activity at one or more elements (e.g., gates, pins, etc.) of the integrated circuit. Switching activity refers to changes in signals that are transmitted through elements of the IC. Switching activity can be measured based on probability data and toggle density data. Probability data indicates a probability that a signal will have a high logic value (e.g., a logic value of '1') or a low logic value (e.g., a logic value of '0'). In one example, a switching probability of 100% can indicate that the signal is always high (e.g., always has a value of '1') while a switching probability of 0% can indicate that the signal is always low (e.g., always has a value of '0'). Toggle density refers to a number of switches at an element per unit of time (e.g., one clock cycle).

As switching activity data can be time consuming to obtain, such data may not be available during initial stages of the IC design process. In such instances, a power analysis can be conducted during a design phase of the IC design process based on other types of data, such as clock data, primary input data, special control signal data, etc. However, since the activity data for the IC is not considered during the power analysis, power consumption estimates of the power analysis may not be accurate or realistic for the IC.

After an IC design is completed, one or more optimization processes can be performed (e.g., by a computing system) to optimize the IC design before fabrication. An optimization process can identify and apply an optimized design for the IC, including sizing optimization, buffering optimization, netlist restructuring, banking optimization (e.g., merging two or more registers into a single area), de-banking optimization (e.g., separating two or more registers into separate areas), sequential sizing, and so forth. In one example, an optimization process can determine to insert one or more buffer elements (e.g., as two inverter elements back-to-back) into the IC design to optimize signal timing through the IC. In another example, an optimization process can eliminate redundancy in multiple elements (e.g., multiple inverter elements) by replacing the multiple elements with a single element at a different location of the logic flow at the IC. In some instances, switching activity data can be available after completion of the one or more optimization processes. An updated power analysis can be performed for the optimized IC before an IC fabrication process is performed.

As size and complexity of ICs increases, designers and/or engineers apply a hierarchical design to ICs to break IC components into manageable units. A hierarchical IC design can include multiple blocks of IC elements (sometimes referred to as sub-chips, sub-blocks, modules, hierarchical blocks, etc.) that can be designed and/or optimized separately and/or in parallel. After the blocks are designed and optimized, they are integrated to create the IC. In some instances, elements of different blocks can interact (e.g., via a wire or other coupling element) during operation of the IC. Elements of a block can interact with elements of another block that is at the same hierarchical level or at a different hierarchical level (e.g., depending on the hierarchical design implemented for the IC). A hierarchical boundary is a boundary between elements of a first block and elements of a second block. In some instances, a pin (referred to as a hierarchical pin) or another element can connect coupling elements (e.g., wires) of two blocks at the hierarchical boundary.

As indicated above, one or more elements can be added or removed in the IC design based on the optimization processes performed for the IC. In some instances, adding or removing an element at a region of the IC can impact a polarity of a signal transmitted through that region. For example, as indicated above, a buffer element can be added to an IC design based on an optimization process. The buffer element can include two inverter elements without out any elements in between in the logic flow (e.g., back-to-back). When a signal reaches the buffer, the first inverter element inverts the signal from a first polarity (e.g., positive) to a second polarity (e.g., to negative). The second inverter element then inverts the signal from the second polarity (e.g., negative) back to the first polarity (e.g., back to positive). The one or more optimization processes do not consider the hierarchical design of the IC when determining which optimization technique to apply to the IC design. Accordingly, the optimization process(es) can, in some instances, add or remove an element to the IC design that flips the polarity of the element at a hierarchical boundary. In accordance with the previous example, the optimization process(es) can add a buffer at a hierarchical boundary of an IC design such that the first inverter is added upstream from a hierarchical pin (e.g., at a first block) and the second inverter is added downstream from the hierarchical pin (e.g., at a second block). By adding the buffer at the hierarchical boundary, the signal that leaves the first block has a different polarity than it would have if the buffer were not added to the IC design. Similarly, the signal that enters the second block has a different polarity than it would have if the buffer were not added to the IC design.

Switching activity data that is used to perform an updated power analysis can be generated based on a structure of the IC prior to the optimization process(es). Accordingly, the switching activity data may not account for signal flipping that occurs based on elements that are added or removed from the IC design during the optimization process(es). As indicated above, some optimizations applied based on the optimization process(es) can flip a polarity of signals at hierarchical boundaries, which is not accounted for by the switching activity data. Accordingly, the updated power analysis that is performed using the switching activity data does not realistically or accurately represent the amount of power consumed by the IC design. Accordingly, the amount of power consumed by the IC design cannot be affectively reduced, which can cause an increased amount of power consumption by the fabricated IC.

Implementations of this disclosure address the above-mentioned and other deficiencies by providing techniques for preserving switching activity during IC optimization. A power analysis component (e.g., of a computing system of a manufacturing environment) can create or otherwise obtain a netlist during a design phase of an IC fabrication process. A netlist indicates each element of the IC design and a connection of each element to other elements of the IC design. In some embodiments, the netlist can be a synthesized netlist. In some embodiments, the synthesized netlist can be obtained based on register transfer level (RTL) data associated with the IC (e.g., obtained from a user associated with the IC). Prior to an optimization process for the IC design, polarity data for each element of the IC can be generated based on the elements indicated by the netlist. Polarity data can indicate a polarity state (e.g., a positive state, a negative state, etc.) for a signal before and/or after the signal is received at a respective element of the IC. In some embodiments, a positive state can correspond to a high value (e.g., a value of '1') for the signal and a negative state can correspond to a low value (e.g., a value of '0') for the signal. The polarity state of the signal can define an activity of the signal. Accordingly, a positive polarity state can define an activity of the signal that is different from an activity defined by a negative polarity state. In some embodiments, the power analysis component can generate a polarity mapping between each element of the IC design and polarity data associated with the respective element. Such mapping is referred to herein as an initial polarity mapping or a golden polarity mapping.

After one or more optimization processes are performed for the IC design, the power analysis component can generate an updated polarity mapping based on the optimizations made during the optimization process(es). The updated polarity mapping can indicate polarity data associated with each element of the optimized IC design. As indicated above, the optimization process(es) can add or remove elements of the IC design. Accordingly, the updated polarity mapping can include polarity data based on the added or removed elements, which may be different from the polarity data of the initial polarity mapping or the golden polarity mapping. In an illustrative example, the netlist can indicate a hierarchical pin at a hierarchical boundary of one or more blocks. The initial polarity mapping can indicate that the signal leaving the hierarchical pin has a positive state (e.g., corresponding to a high value). A buffer can be added at or around the hierarchical pin, which adds a first inverter upstream to the hierarchical pin and a second inverter downstream from the hierarchical pin. Accordingly, an updated polarity mapping can indicate that the signal leaving the hierarchical pin has a negative state (e.g., corresponding to a high value).

The power analysis component can compare the polarity data of the initial polarity mapping to the updated polarity mapping to determine whether any of the optimization techniques implemented by the optimization process(es) has changed the signal activity at elements of the IC design. In accordance with the previous illustrative example, the power analysis component can determine that the signal polarity at the hierarchical pin has flipped (e.g., from a positive state to a negative state) based on the optimization techniques. Accordingly, the signal activity at the hierarchical pin has changed. The power analysis component can invert the signal that is applied at the hierarchical pin to account for the activity change at the hierarchical pin based on the optimization. Accordingly, the power analysis component can accurately and realistically determine the amount of power that is consumed at the hierarchical pin and/or at other regions of the IC design based on the optimization techniques implemented by the optimization process(es).

Aspects of the present disclosure address the above and other deficiencies by providing techniques for tracking changes to signal activity at elements of an IC based on optimizations applied to the IC design. By generating an initial polarity map or golden polarity map prior to the optimization process(es) for the IC design, a power analysis component can obtain polarity data indicating a polarity state of each element of the IC before the IC design is modified by the optimization process(es). The initial polarity map data can be compared to updated polarity map data generated for the IC design after completion of the optimization process(es) to identify changes in signal activity based on the optimizations. The power analysis component account for the changes in signal activity to accurately and realistically determine the amount of power consumed by the IC during operation, which can be reduced by further optimization processes, in some embodiments. Accordingly, an overall amount of power consumed by fabricated ICs is reduced, which can extend a battery life and/or otherwise improve performance of a device including the fabricated IC.

FIG. 1 illustrates an example system architecture 100, in accordance with some embodiments of the present disclosure. In some embodiments, system architecture 100 (referred to simply as "system" herein) can be included at or otherwise accessible to a manufacturing environment for designing, optimizing, and/or fabricating integrated circuits (ICs). As illustrated in FIG. 1, system 100 can include one or more computing systems (e.g., computing system 110, computing system 120, computing system 130, etc.) and/or a data store 140, each connected via a network 108. In some embodiments, network 108 is a public network and/or a private network. Network 108 can include one or more wide area networks (WANs), local area networks (LANs), wired networks (e.g., Ethernet network), wireless networks (e.g., an 802.11 network or a Wi-Fi network), cellular networks (e.g., a Long-Term Evolution (LTE) network), routers, hubs, switches, server computers, cloud computing networks, and/or a combination thereof. Data store 140 can include memory that stores data associated with designing, optimizing, and/or fabricating an IC device.

A design and fabrication process for fabricating an IC can include one or more distinct phases, such as a design phase, an optimization phase, a power analysis phase, and so forth. During the design phase, a structure and configuration of elements included in an IC design is determined. In some embodiments, the IC design is created and/or determined by a designer and/or operator of the manufacturing environment (e.g., using a client device). In other or similar embodiments, the IC design is created and/or determined using one or more applications running on a computing system (e.g., computing system 110, computing system 120, computing system 130, etc.) of system 100. The elements and configuration of the IC design can be defined based on register transfer level (RTL) data 142 for the IC. RTL data 142 can represent an abstraction defining digital portions of an IC design. In some embodiments, RTL data 142 can include an indication of one or more registers that are to hold state information for the IC design, combinational logic defining nest state inputs, and/or clock data indicating when the state of a signal changes. In some embodiments, RTL data 142 can be provided to system 100 by a user associated with a fabricated IC. For example, a user (e.g., a customer) associated with an IC design can provide the RTL data 142 to system 100 (e.g., using a client device) for use in creating for the IC design (e.g., by a designer and/or engineer). In other or similar embodiments, RTL data 142 can be generated based on other data for an IC design (e.g., target performance data, target usage data, etc.) provided to the system 100 by a user (e.g., a customer). RTL data 142 can be obtained according to other techniques, in some embodiments.

As illustrated in FIG. 1, computing system 110 can include a netlist generator component 112. The netlist generator component 112 can generate (or synthesize) a netlist 144 based on RTL data 142. Such netlist 144 is referred to herein as a synthesized netlist 144. In some embodiments, netlist generator component 112 can obtain the synthesized netlist 144 by applying one or more logic synthesis operations to the RTL data 142. A logic synthesis operation can, in some embodiments, accept RTL data 142, library data for standard elements and/or cells of an IC design, and/or design and timing constraint data as an input and provide data of a synthesized netlist 144 as an output. The synthesized netlist 144 can indicate gate-level elements of the IC design and connections between the indicated gate-level elements. Data and information of synthesized netlist 144 can correspond to a preliminary design for the IC, in accordance with embodiments of the present disclosure.

In some embodiments, computing system 120 can include a power analysis component that conducts a power analysis of the IC design. A power analysis can include a calculation of estimation of an amount of power (e.g., static power, dynamic power, etc.) that is consumed by an IC. Power consumption can be measured by switching activity at one or more elements of the IC, in some embodiments. As indicated above, switching activity refers to changes in signals that are transmitted through IC elements. Switching activity can be measured or otherwise quantified based on switching probability (e.g., a probability that a signal will have a high logic value or a low logic value) and toggle density or toggle rate (e.g., a number of switches at an element per unit of time). Power analysis component 122 can conduct the power analysis by analyzing the elements of the IC design and determining the switching probability and toggle density for one or more of the IC design elements. In some embodiments, power analysis component 122 can conduct the power analysis based on synthesized netlist 144 and switching activity data 146 for the IC design. In some instances, switching activity data 146 is not available during a design phase of the IC fabrication process. Accordingly, power analysis component 122 can conduct an initial power analysis based on synthesized netlist 144 (e.g., without switching activity data 146) and can conduct an updated power analysis after switching activity data 146 is obtained for the IC design, as described below.

Computing system 130 can include a device optimizer component 132, in some embodiments. Device optimizer component 132 can perform one or more optimization operations with respect to a preliminary IC design (e.g., indicated by synthesized netlist 144) to obtain an optimized IC design. The optimized IC design can be a modified design of the preliminary IC design according to one or more optimization techniques identified by the device optimizer component 132 based on the performance of the one or more optimization operations. In some embodiments, the one or more optimization techniques can include a sizing optimization, a buffering optimization, a netlist restructuring, a banking optimization, a de-banking optimization, sequential sizing, and so forth. Examples and explanation of optimized IC designs are provided herein.

Figures 2A, 2B:
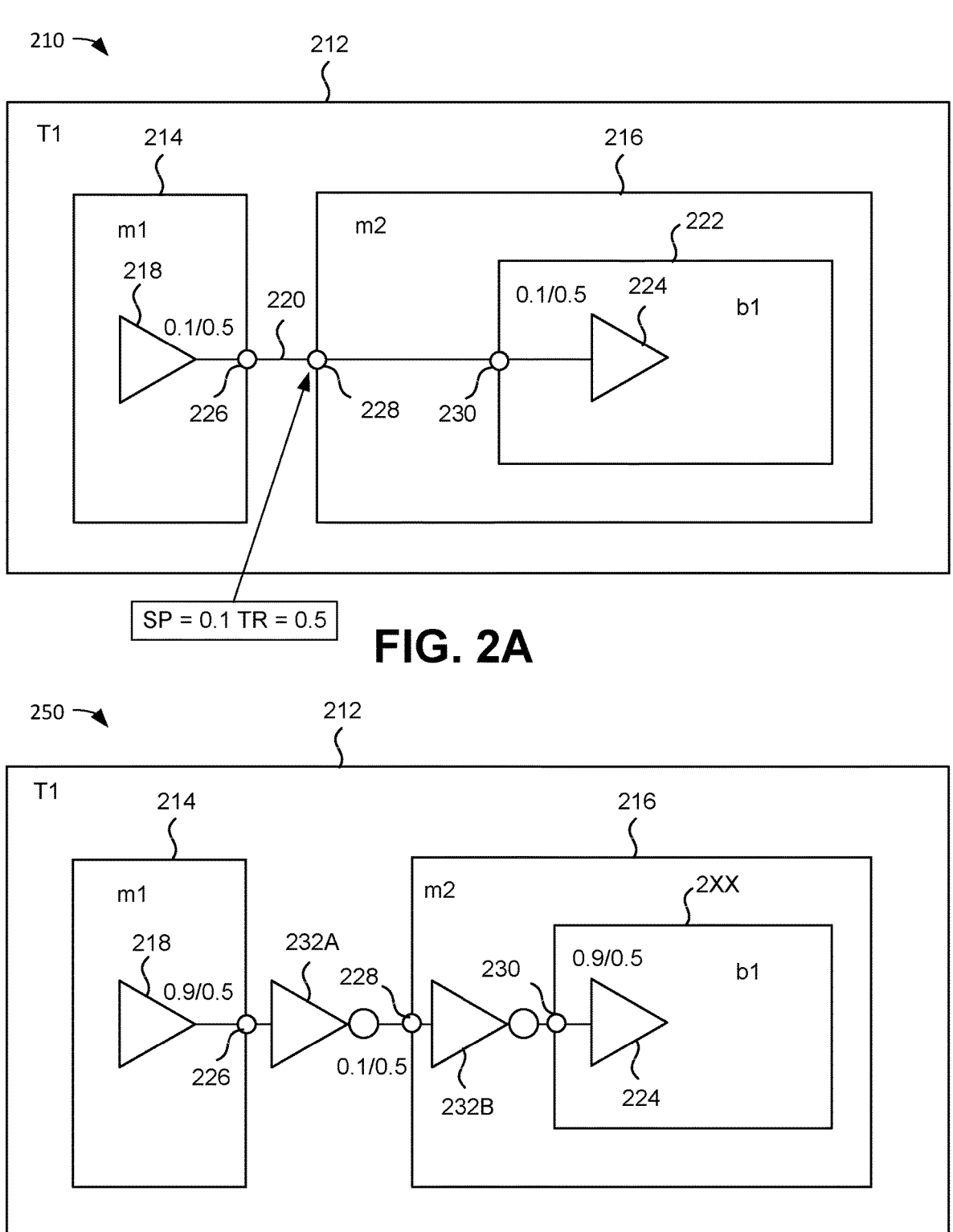
FIGS. 2A and 2B illustrate an example of activity specified on a hierarchical pin of an integrated circuit, in accordance with some embodiments of the present disclosure.

FIGS. 2A and 2B illustrate an example of a preliminary design 210 and an optimized design 250 for one or more IC elements, as determined by device optimizer component 132, in accordance with some embodiments of the present disclosure. As described above, elements of an IC design can be organized according to a hierarchical structure, in some embodiments. For example, elements of an IC design can be organized by blocks, which can each be associated with a respective hierarchy level. As illustrated in FIG. 2A, block 212 (e.g., block T1) can include additional block element 214 (e.g., block m1) and block element 216 (e.g., block m2). Block element 214 can include a driver element 218 that transmits (e.g., drives a signal) to elements of block element 216 via connection 220 (e.g., a wire). In some embodiments, block element 216 can include an additional block element 222 (e.g., block bl), which includes a sink element 224. Sink element 224 can receive the signal transmitted from driver element 218 via connection 220, in some embodiments.

In some embodiments, blocks 212, 214, 216 and 222 can each be associated with a respective hierarchical level, as defined by synthesized netlist 144. In an illustrative example, block 212 can be associated with a first hierarchical level, blocks 214 and 216 can be associated with a second hierarchical level, and block 222 can be associated with a third hierarchical level. The first hierarchical level of block 212 can be higher than the second hierarchical level of blocks 214 and 216, which can be higher than the third hierarchical level of block 222, in some embodiments. As described above, elements of blocks can be enabled to communicate with elements of other blocks, regardless of the associated hierarchical level for the respective blocks. In some embodiments, a hierarchical pin can be placed at a boundary between two blocks which facilitate communication between elements of the blocks. For example, as illustrated in FIG. 2A, a first hierarchical pin 226 can be placed at a boundary between block 214 and block 212, a second hierarchical pin 228 can be placed at a boundary between block 212 and block 216, and a third hierarchical pin 230 can be placed at a boundary between block 216 and block 222.

As indicated above, power analysis component 122 can perform an initial power analysis for IC design 210 (e.g., without switching activity data 146 for IC design 210). The initial power analysis can be performed to determine a switching probability (SP) and/or a toggle density or toggle rate (TR) for one or more elements of IC design 210. In an illustrative example, based on the initial power analysis, power analysis component 122 can determine that a SP value for hierarchical pin 228 is approximately 0.1 (e.g., the signal transmitted through hierarchical pin 228 is high 10% of the time) and a TR value for the hierarchical pin is approximately 0.5. Similarly, power analysis component 122 can determine that the SP values for driver element 218 and sink element 224 also have a SP value of approximately 0.1 and a TR value of approximately 0.5. It should be noted that the SP values and TR values of the present application are provided merely for example and explanation only. Other SP values and TR values are possible.

Figure 4A:
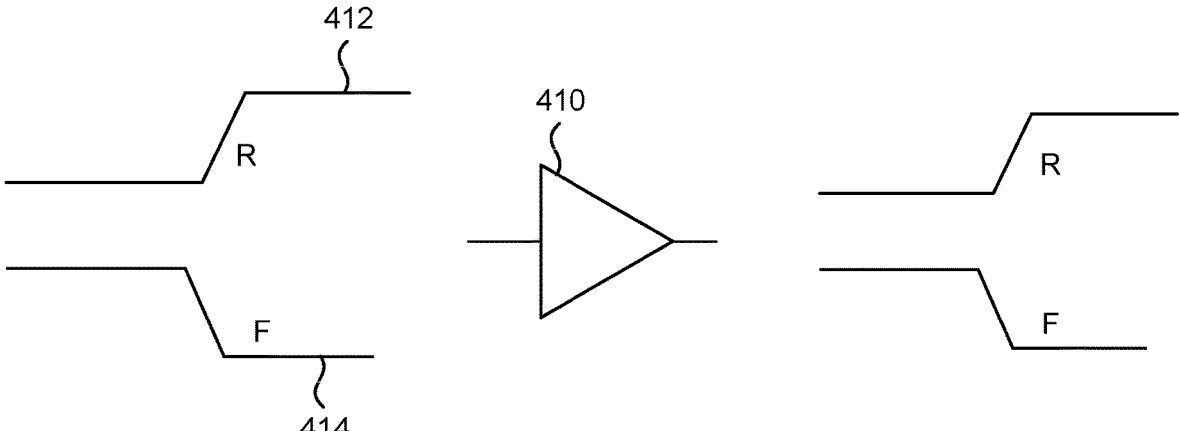
FIGS. 4A and 4B illustrate example polarity transitions at an integrated circuit, in accordance with some embodiments of the present disclosure.

As indicated above, FIG. 2B illustrates an optimized IC design 250. Optimized IC design 250 can be obtained based on one or more optimization processes performed for preliminary IC design 250 by device optimizer component 132, as described above. As illustrated in FIG. 2B, optimized IC design 250 can include a buffer element 232 added to preliminary IC design 210. A buffer element 232 temporarily hold a signal transmitted through an IC by temporarily inverting a polarity of the signal received at the buffer element 232 and then reverting the polarity of the signal before it is transmitted to another element. FIG. 4A illustrates an example buffer element 410. As illustrated in FIG. 4A, rising signal 412 can be received at buffer element 410. The rising signal 412 can have a positive state corresponding to a high value (e.g., a value of '1'). Buffer element 410 can temporarily hold the signal 412 before it is transmitted to another element of the IC, as described above. As illustrated in FIG. 4A, the positive state of rising signal 412 is maintained when the rising signal 412 leaves buffer element 410. Similarly, a falling signal 414 can be received at buffer element 410. The falling signal 414 can have a negative state corresponding to a low value (e.g., a value of '0'). Buffer element 410 can temporarily hold the signal 414 before it is transmitted to another element of the IC, as described above. As illustrated in FIG. 4A, the negative state of falling signal 414 is maintained when the falling signal 414 leaves buffer element 410.

Figure 4B:
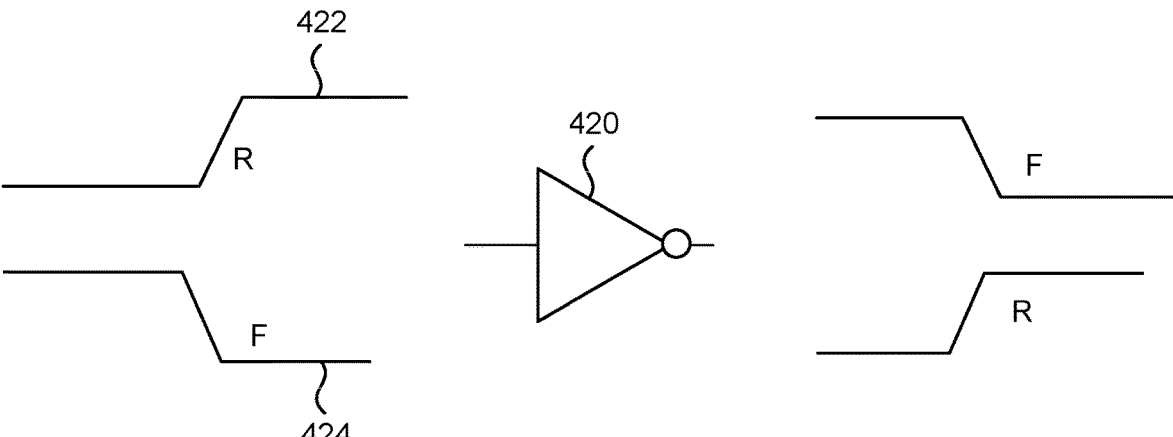

As indicated above, buffer element 232 can include two or more components (e.g., inverters) that temporarily hold a transmitted signal by inverting and reverting a polarity of the signal before it is transmitted to another element. In some embodiments, buffer element 232 can include a first buffer element 232A, which can be a first inverter element, and a second buffer element 232B, which can be a second inverter element. First buffer element 232A and second buffer element 232B can be placed back-to-back in the IC design so that the polarity of the signal received at buffer element 232 is the same as the polarity of the signal transmitted from buffer element 232. An inverter element can invert or flip a polarity state of a signal (e.g., from a positive state to a negative state or from a negative state to a positive state). FIG. 4B illustrates an example inverter element 420. As illustrated in FIG. 4B, a rising signal 422 can be received at inverter element 420. Inverter element 420 can invert a polarity state of rising signal 422 before it is transmitted to another element of the IC. By inverting the polarity of rising signal 422 (e.g., having a positive polarity state), inverter element 420 transforms rising signal 422 into a falling signal (having a negative polarity state). Similarly, inverter element 420 can invert a polarity state of a falling signal 424 before it is transmitted to another element of the IC. By inverting the polarity of falling signal 424 (e.g., having a negative polarity state), inverter element 420 transforms falling signal 424 into a rising signal (e.g., having a positive polarity state). As indicated above, buffer element 232 can include two inverter elements back-to-back. Accordingly, inverted signal 422 and/or inverted signal 424 are transmitted from a first inverter element of buffer 232 to a second inverter element of buffer 232. The second inverter element of buffer 232 can invert the polarity state of the inverted signal 422 and/or inverted signal 424, which accordingly reverts the signals to the polarity state before the signal was received at buffer 232. It should be noted, however, that in some embodiments, other types of buffer elements 232 (e.g., buffer elements that do not include one or more inverters) can be used or otherwise included as part of the IC design.

Referring back to FIG. 2B, device optimizer component 132 can include first buffer element 232A upstream of hierarchical pin 228 and second buffer element 232B downstream of hierarchical pin 228. Due to this buffer configuration, the polarity of the signal transmitted through hierarchical pin 228 of optimized IC design 250 is different (e.g., based on the inversion by first buffer element 232A) from the polarity of the signal at through hierarchical pin 228 of preliminary IC design 250. As illustrated in FIG. 2B, the change in polarity at the hierarchical pin by the optimized IC design 250 causes the SP values for driver element 218 and sink element 224 to be approximately 0.9 (e.g., the signal transmitted from driver element 218 is high 90% of the time). Accordingly, the optimized IC design 250 impacts the switching activity of preliminary IC design 210 and power analysis component 122 cannot accurately or realistically calculate the power consumption of the IC based on the preliminary IC design 210 (e.g., indicated by synthesized netlist 144).

Figures 3A, 3B:
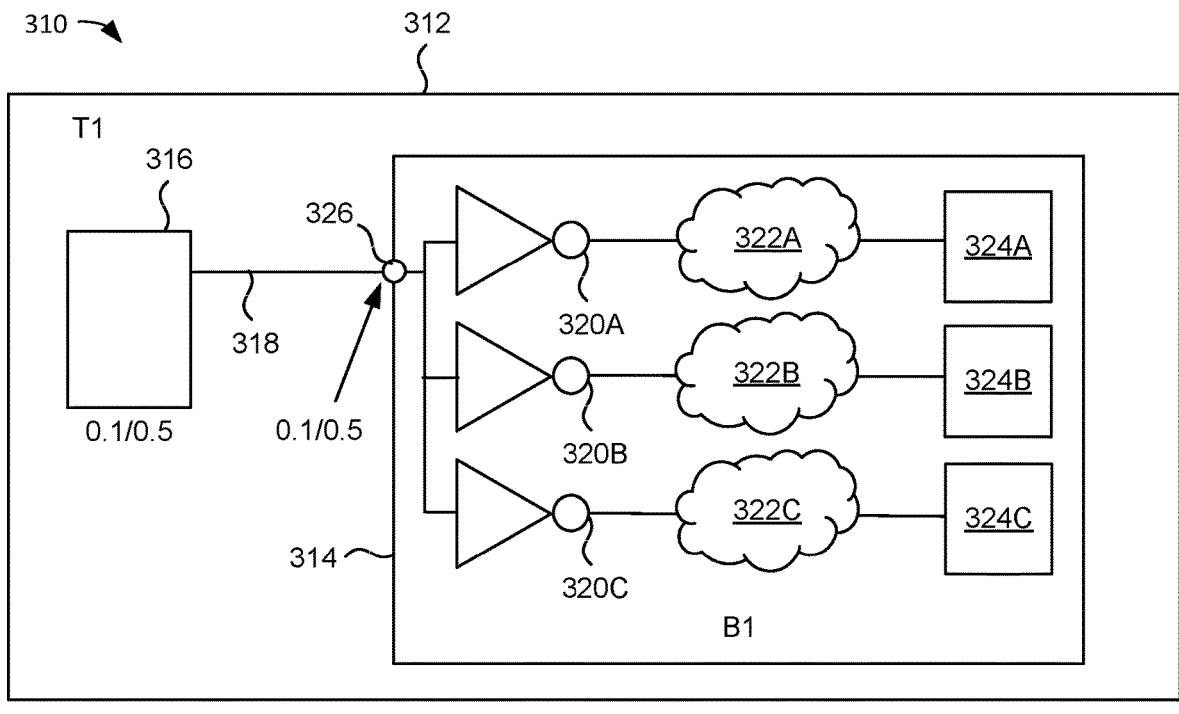
FIGS. 3A and 3B illustrate another example of activity specified on a hierarchical pin of an integrated circuit, in accordance with some embodiments of the present disclosure.

FIGS. 3A and 3B illustrate another example of a preliminary design 310 and an optimized design 350 for one or more IC elements, as determined by device optimizer component 132, in accordance with some embodiments of the present disclosure. As illustrated in FIG. 3A, preliminary IC design 310 (e.g., generated based on synthesized netlist 144) can include a first block 312 (e.g., a T1 block) and a second block 314 (e.g., a B1 block). First block 312 can be associated with a different hierarchical level than second block 314, in some embodiments. First block 312 can include at least a first register element 316 that is connected to elements of second block 314 via connector 318 (e.g., a wire). Second block 314 can include one or more inverter elements 320 each connected to a cluster of elements 322.

The cluster of elements 322 can be further connected to a respective second register element 324, as illustrated in FIG. 3A. In some embodiments, inverter elements 320 can be parallel inverter elements 320 that are each connected to respective parallel clusters of elements 322. For example, a first inverter element 320A can be connected to cluster 322A, which is in parallel to a second inverter element 320B connected to cluster 322B, which is further in parallel to a third inverter element 320C connected to cluster 322C.

In some embodiments, a hierarchical pin 326 can be placed at a hierarchical boundary between block 312 and block 314. The hierarchical pin 326 can facilitate communication between elements of block 312 and block 314, as described above. In an illustrative example, power analysis component 122 can determine that a SP value of hierarchical pin 326 is approximately 0.1 and a toggle density or toggle rate of hierarchical pin 326 is approximately 0.5. Power analysis component 122 can accordingly determine that a SP value of register element 316 is also approximately 0.1 and a toggle density or toggle rate of register element 316 is approximately 0.5.

In some embodiments, device optimizer component 132 can determine that the inclusion of first inverter element 320A, second inverter element 320B, and third inverter element 320C in block 314 is redundant and can be replaced with a single inverter element 328. As illustrated in FIG. 3B, optimized IC design 350 does not include first inverter element 320A, second inverter element 320B, and third inverter element 320C in block 314. Instead, inverter element 328 is placed in block 312, upstream from hierarchical pin 326. As inverter element 328 is placed upstream from hierarchical pin 326, a polarity of the signal that is received at hierarchical pin 326 of optimized IC design 350 is different from the polarity of the signal that is received at hierarchical pin 326 of preliminary IC design 310. Accordingly, the optimized IC design 350 impacts the switching activity of preliminary IC design 310 and power analysis component 122 cannot accurately or realistically calculate the power consumption of the IC based on the preliminary IC design 310 (indicated by synthesized netlist 144).

Referring back to FIG. 1, power analysis component 122 may not accurately or realistically determine the power consumption of the IC based on a preliminary design of the IC, as optimization techniques applied to the preliminary design by device optimizer component 132 may impact the switching activity of a signal through the IC. Such impact cannot be known or predicted by power analysis component 122 before the optimization techniques are applied to the preliminary design. In some embodiments, power analysis component 122 can track the impact to the switching activity based on the optimization techniques by tracking polarity data 148 for one or more elements of the IC before and after the optimization techniques are applied.

Polarity data 148 can indicate a polarity state of a signal at a respective element of the IC. In some embodiments, power analysis component 122 (or another component of system 100) can determine a polarity state associated with each element of the IC, as indicated by netlist 144 before optimization processes are performed by device optimizer component 132. In some embodiments, the polarity state can be determined for a respective element based on an activity of one or more elements that are upstream from the respective element. Further details regarding determining the polarity state for elements of an IC design are provided with respect to FIGS. 5A and 5B below. Power analysis component 122 can generate a mapping between the determined polarity state and a corresponding element indicated by synthesized netlist 144 and can store the generated mapping as polarity data 148 at data store 140. In some embodiments, power analysis component 122 can update synthesized netlist 144 to include the generated mapping. In other or similar embodiments, power analysis component 122 can store the generated mapping separate from synthesized netlist 144.

After the one or more optimization processes are performed by device optimizer component 132, power analysis component 122 can generate updated polarity data for the elements of the optimized IC design, in some embodiments. In some embodiments, device optimizer component 132 can update synthesized netlist 144 based on the optimization techniques performed for the preliminary IC design. The updated synthesized netlist can include an indication of the elements of the optimized IC design and connections between the elements. The updated polarity data can indicate a polarity state for each of the elements of the optimized IC design, which can include different and/or additional elements from the elements of the preliminary IC design, as described above. In some embodiments, power analysis component 122 can generate the updated polarity data by generating an updated mapping between the determined updated polarity states and the elements of the optimized IC design. The updated mapping can be stored with or separately from polarity data 148 at data store 140. In additional or alternative embodiments, power analysis component 122 can include the updated mapping with the updated synthesized netlist at data store 140.

FIGS. 5A and 5B illustrate example polarity mappings for an IC design, in accordance with some embodiments of the present disclosure. FIG. 5A illustrates a preliminary IC design 510, generated based on synthesized netlist 144, as described above. As illustrated in FIG. 5A, preliminary IC design 510 includes a first block 512 (e.g., a top block) and a second block 514 (e.g., a blk block). The first block 512 can be associated with a different hierarchy level than the second block 514, in accordance with previously described embodiments. First block 512 can include at least a driver element 516 that is connected to a sink element 518 of second block 514 (e.g., via a connector such as a wire). First block 512 and/or second block 514 can include additional or alternative elements, in some embodiments. For example, first block 512 can include a clock element 520 and/or second block can include a latch element 522, in some embodiments. A hierarchical pin 524 can facilitate communication between elements of first block 512 and second block 514, as described above.

As described above, power analysis component 122 can generate polarity data 148 associated with elements of preliminary IC design 510 before device optimizer component 132 performs any optimization processes with respect to power analysis component 122. The polarity data can include an initial polarity mapping 530A (also referred to as a golden polarity mapping) between each element of preliminary IC design 510 (e.g., indicated by synthesized netlist 144) and a polarity state determined for each respective element. In some embodiments, power analysis component 122 can determine a polarity state for an element of an IC design based on the activity of another element that is upstream from the element. In an illustrative example, power analysis component 122 can determine that a signal received or generated at driver element 516 is associated with a positive polarity state. Power analysis component 122 can determine this based on data of synthesized netlist 144, other data provided by a user associated with preliminary IC design 510, and/or data associated with the signal received at driver element 516 (e.g., from another element of preliminary IC design 510 not shown in FIG. 5A). Power analysis component 122 can determine that the activity of driver element 516 does not invert the polarity state of the signal and, accordingly, the signal leaving driver element 516 also has a positive polarity state. As illustrated by polarity map 530A, the polarity state of the incoming signal to driver element 516 is positive and the outgoing signal from driver element 516 is positive.

Power analysis component 122 can determine the polarity state of each element of preliminary IC design 510 and can map the determine polarity state to each element of synthesized netlist 144, as described above. FIG. 5B illustrates an optimized IC design 550 based on optimization techniques applied to preliminary IC design 510 by device optimizer component 132, as described above. As illustrated in FIG. 5B, device optimizer component 132 adds a buffer element 552 between driver element 516 and sink element 518. The buffer element 552 can include a first inverter element 552A and a second inverter element 552B, as described above. As illustrated in FIG. 5B, the first inverter element 552A is upstream from hierarchical pin 524 and the second inverter element 552B is downstream from hierarchical pin 524. Accordingly, a polarity of the signal at hierarchical pin 524 of optimized IC design 550 is different from the polarity of the signal at hierarchical pin 524 of preliminary IC design 510, in accordance with previously described embodiments.

As described above, synthesized netlist 144 can be updated based on the optimization techniques applied to preliminary IC design 510. Power analysis component 122 can generate updated polarity data based on the updates to synthesized netlist 144, in some embodiments. In some embodiments, power analysis component 122 can generate the updated polarity data for a respective element of the updated synthesized netlist based on an activity of an element upstream from the respective element, as described above. Power analysis component 122 can generate an updated polarity mapping (e.g., polarity map 530B) based on the updated polarity data and the updated synthesized netlist, as described above. As illustrated by polarity map 530B, the polarity of the signal transmitted from first inverter element 552A is inverted from a positive state to a negative state. Accordingly, the polarity of the signal received at hierarchical pin 524 has a negative state (e.g., indicated by top/bIN of polarity map 530B), which is different from the polarity state of the signal received at hierarchical pin 524 of preliminary IC design 510 (e.g., indicated by top/bIN of polarity map 530B).

Referring back to FIG. 1, power analysis component 122 (or another component of system 100) can receive switching activity data 146 for an IC design before, during, or after an optimization process is performed by device optimizer component 132. In some embodiments, the switching activity data 146 can be provided to power analysis component 122 by a user (e.g., a customer) associated with the IC design (e.g., via a client device associated with the user). The switching activity data 146 can be obtained by power analysis component 122 according to other techniques, in some embodiments.

As indicated above, the switching activity data 146 can indicate an expected switching activity for the IC (e.g., after fabrication and installation at a host system). The switching activity data 146 can be generated based on the elements of synthesized netlist 144, rather than based on the elements of the optimized IC design. Accordingly, the switching activity data 146 may not include a switching activity corresponding to elements that are added or removed based on the optimization techniques, as described above. Upon obtaining the switching activity data 146, power analysis component 122 can determine a power consumption associated with the IC design based on the switching activity data 146 and the polarity data 148. In an illustrative example, the power analysis component 122 can determine a polarity state of the signal at one or more elements of the IC design based on the switching activity data 146. For each element of the IC design, power analysis component 122 can compare polarity data associated with the element before the optimization process (e.g., from polarity mapping 530A) and after the optimization process (e.g., from polarity mapping 530B). Based on the comparison, power analysis component 122 can determine whether the polarity of the signal at the element has changed based on the optimization techniques applied to the preliminary IC design. If the polarity signal has not changed, power analysis component 122 can determine the polarity state, and therefore the activity, of the signal to be the same as indicated by the switching activity data 146. Power analysis component 122 can determine the amount of power consumed at the element based on the switching activity data 146 for the element. If the polarity signal has changed, power analysis component 122 can determine the polarity state, and therefore the activity, of the signal has inverted from the switching activity data 146. Therefore, power analysis component 122 can invert the signal applied to the element and determine the amount of power consumed at the element based on the activity of the inverted signal.

In an illustrative example, power analysis component 122 can determine the amount of power consumed by optimized IC design 550 based on switching data 146, polarity map 530A, and polarity map 530B. In one instance, power analysis component 122 can compare the polarity state of the signal at driver element 516 before the optimization (e.g., a positive polarity state) and after the optimization (e.g., a positive polarity state) and determine that the polarity state, and therefore the activity, of the signal at driver element 516 has not changed. Accordingly, power analysis component 122 can determine the power consumed at driver element 516 based on the switching data 146 for driver element 516, as described above. In another or similar instance, power analysis component 122 can compare the polarity state of the signal at hierarchical pin 524 before the optimization (e.g., a positive polarity state) and after the optimization (e.g., a negative polarity state) and determine that the polarity state, and therefore the activity, of the signal at hierarchical pin 524 has changed. Power analysis component 122 can determine the power consumed at hierarchical pin 524 by inverting the signal activity indicated by switching data 146 for hierarchical pin 524.

It should be noted that functions of netlist generator component 112, power analysis component 122, and/or device optimizer component 132 can be provided by a fewer number of computing systems and/or machines. For example, in some embodiments, computing systems 110, 120, and/or 130 can be integrated into a single computing system or a single machine.

FIG. 6 is a flow diagram illustrating an example method 600 for preserving switching activity during integrated circuit optimization, in accordance with some embodiments of the present disclosure. Method 600 can be performed by processing logic that can include hardware (circuitry, dedicated logic, etc.), software (e.g., instructions run on a processing device), or a combination thereof. In one implementation, some or all of the operations of method 600 can be performed by one or more components of system 100 of FIG. 1. In some embodiments, some or all of the operations of method 600 can be performed by netlist generator component 112, power analysis component 122, and/or device optimizer component 132, described with respect to FIGS. 1-5B above.

At block 610, processing logic determines an initial polarity associated with an element of an integrated circuit (IC) design. The initial polarity can correspond to polarity data determined by power analysis component 122 (e.g., of polarity map 530A), in some embodiments. At block 512, processing logic can determine that a process associated with improving at least one of a function or a performance of the integrated circuit design has completed. The process can be an optimization process performed by device optimizer component 132, as described above. As indicated above, one or more elements can be added to or removed from a preliminary IC design for the IC according to one or more optimization techniques, as described above. At block 514, processing logic can determine a current polarity associated with the element. The current polarity can correspond to updated polarity data determined by power analysis component 122 (e.g., of polarity map 530B), in some embodiments.

At block 616, processing logic determines, based on activity data associated with the integrated circuit design that a signal associated with a first activity is to be applied at the element. The activity data can be provided to processing logic by a user associated with the IC design, as described above. In some embodiments, the activity data can be included in a SAIF file. At block 618, processing logic determines whether the current polarity associated with the element corresponds to the initial polarity associated with the element. In some embodiments, processing logic can compare the polarity state for the element of polarity map 530A with the polarity state for the element of polarity map 530B.

In response to processing logic determining that the current polarity associated with the element corresponds to (e.g., matches or substantially matches) the initial priority associated with the element, method 600 can proceed to block 620. At block 620, processing logic maintains the signal applied to the pin. Processing logic can determine the amount of power consumed at the element based on the maintained signal, as described above. In response to processing logic determining that the current polarity associated with the element does not correspond to the initial priority associated with the element, method 600 can proceed to block 622. At block 622, processing logic inverts the signal applied to the element. The inverted signal is associated with a second activity that is inverted from the first activity. Processing logic can determine the amount of power consumed at the element based on the inverted signal, as described above.

Figure 7:
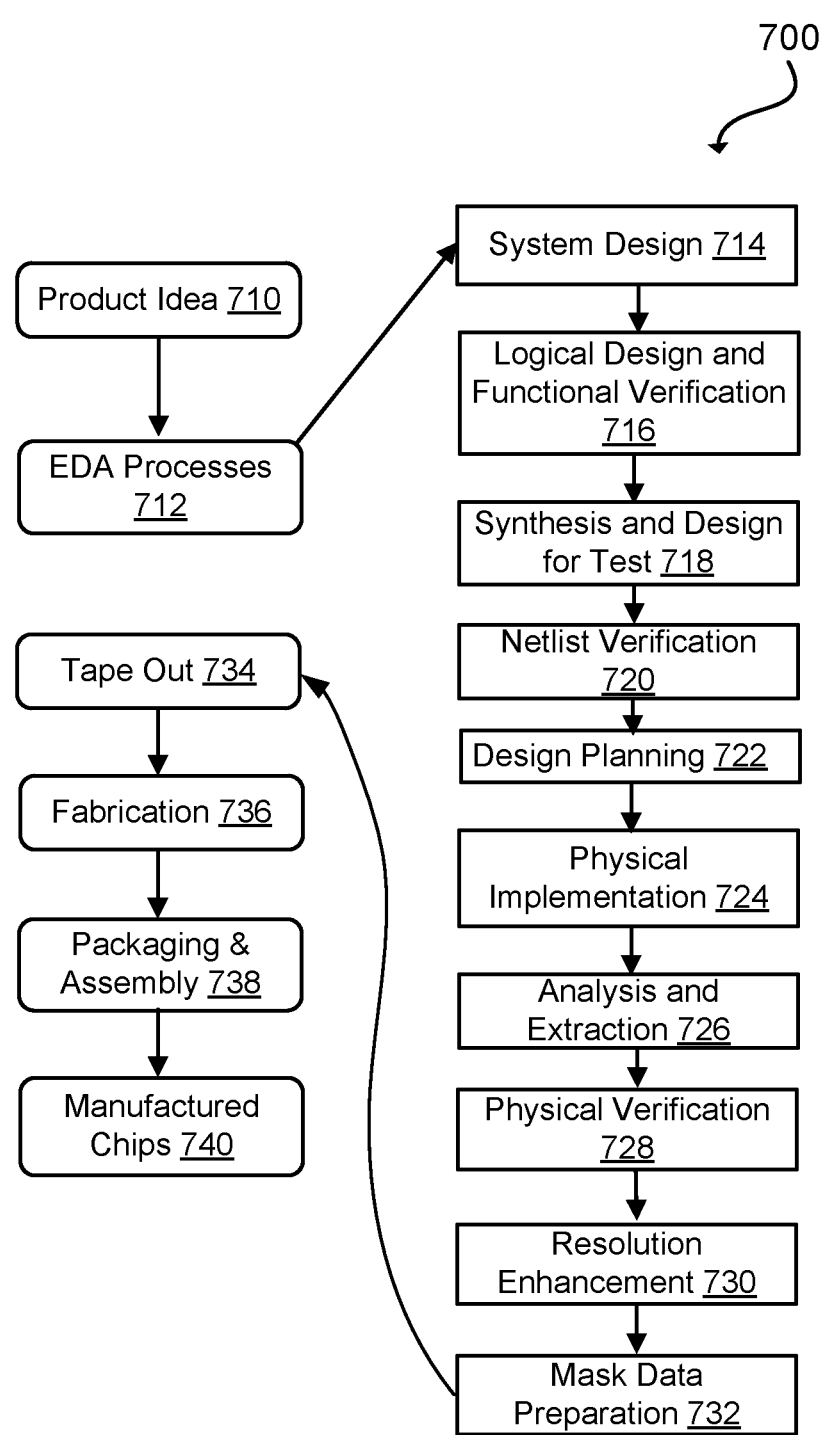
FIG. 7 depicts a flowchart of various processes used during the design and manufacture of an integrated circuit in accordance with some embodiments of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
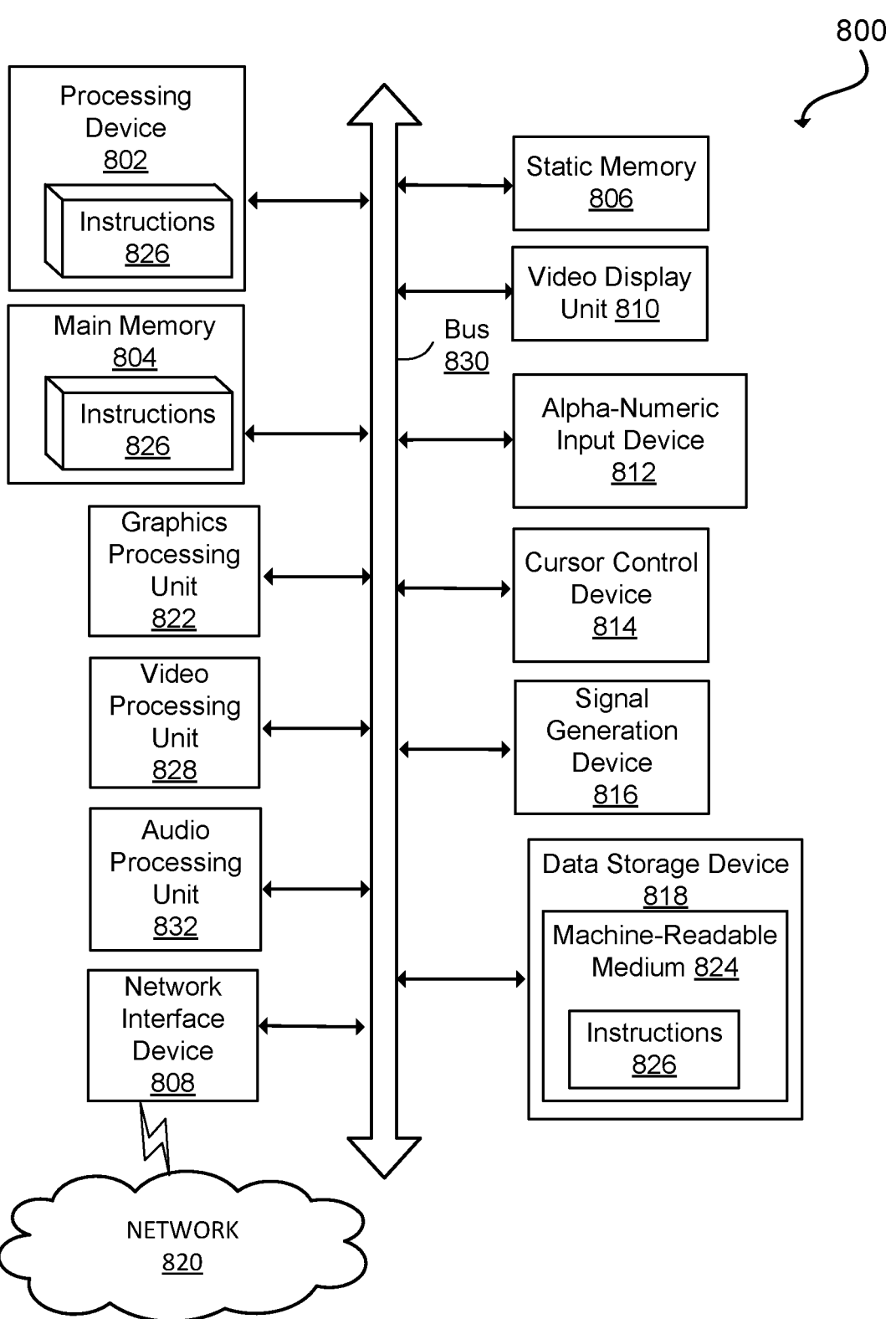
FIG. 8 depicts an abstract diagram of an example computer system in which embodiments of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

determining an initial polarity associated with an element of an integrated circuit design prior to an optimization process;

responsive to determining that the optimization process associated with improving at least one of a function or a performance of the integrated circuit design has completed, determining a current polarity associated with the element, wherein the optimization process modifies a structure of the integrated circuit design prior to fabrication;

determining, based on activity data associated with the integrated circuit design, that a signal is to be applied at the element, wherein the signal is associated with a first activity; and responsive to determining that the current polarity associated with the element does not correspond to the initial polarity associated with the element, inverting the signal applied to the element, wherein the inverted signal is associated with a second activity that is inverted from the first activity.

2. The method of claim 1, wherein the element is a hierarchical pin.

3. The method of claim 1, wherein determining the initial polarity associated with the element comprises determining a respective initial polarity associated with each element of the integrated circuit design, and storing an indication of each determined initial polarity at a memory associated with the integrated circuit design, and wherein determining the current polarity associated with the element comprises determining a respective current polarity associated with each element of the integrated circuit design, and storing each determined current polarity at the memory.

4. The method of claim 3, further comprising:

identifying each element of the integrated circuit design based on a synthesized netlist associated with the integrated circuit design.

5. The method of claim 3, wherein determining that the current polarity associated with the element does not correspond to the initial polarity associated with the element comprises:

retrieving, from the memory, the initial polarity associated with the element; and comparing the initial polarity associated with the element to the current polarity associated with the element.

6. The method of claim 1, further comprising:

responsive to determining that the current polarity associated with the element corresponds to the initial polarity associated with the element, maintaining the signal at the element.

7. The method of claim 6, further comprising:

determining an amount of power consumed at the element based on the inverted signal or the maintained signal at the element.

8. The method of claim 1, further comprising:

obtaining the activity data associated with the integrated circuit design based on a switching activity interchange format (SAIF) file associated with the integrated circuit design.

9. The method of claim 8, further comprising:

receiving the SAIF file from a client device associated with a user of the integrated circuit design.

10. A system comprising:

a memory storing instructions; and a processor, coupled with the memory and to execute the instructions, the instructions, when executed, to cause the processor to:

determine an initial polarity associated with an element of an integrated circuit design prior to an optimization process;

responsive to determining that the optimization process associated with improving at least one of a function or a performance of the integrated circuit design has completed, determine a current polarity associated with the element, wherein the optimization process modifies a structure of the integrated circuit design prior to fabrication;

determine, based on activity data associated with the integrated circuit design, that a signal is to be applied at the element, wherein the signal is associated with a first activity; and responsive to determining that the current polarity associated with the element does not correspond to the initial polarity associated with the element, invert the signal applied to the element, wherein the inverted signal is associated with a second activity that is inverted from the first activity.

11. The system of claim 10, wherein the element is a hierarchical pin.

12. The system of claim 10, wherein to determine the initial polarity associated with the element, the processor is to:

determine a respective initial polarity associated with each element of the integrated circuit design, and store an indication of each determined initial polarity at a memory associated with the integrated circuit design;

and wherein to determine the current polarity associated with the element, the processor is to:

determine a respective current polarity associated with each element of the integrated circuit design, and store each determined current polarity at the memory.

13. The system of claim 12, wherein the processor is further to:

identify each element of the integrated circuit based on a synthesized netlist associated with the integrated circuit.

14. The system of claim 12, wherein to determine that the current polarity associated with the element does not correspond to the initial polarity associated with the element, the processor is to:

retrieve, from the memory, the initial polarity associated with the element; and compare the initial polarity associated with the element to the current polarity associated with the element.

15. The system of claim 10, wherein the processor is further to:

responsive to determining that the current polarity associated with the element corresponds to the initial polarity associated with the element, apply the signal to the element.

16. The system of claim 10, wherein the processor is further to:

obtain the activity data associated with the integrated circuit design based on a switching activity interchange format (SAIF) file associated with the integrated circuit design.

17. A non-transitory computer readable medium comprising stored instructions, which when executed by a processor, cause the processor to:

determine an initial polarity associated with an element of an integrated circuit design prior to an optimization process;

responsive to determining that the optimization process associated with improving at least one of a function or a performance of the integrated circuit design has completed, determine a current polarity associated with the element, wherein the optimization process modifies a structure of the integrated circuit design prior to fabrication;

determine, based on activity data associated with the integrated circuit design, that a signal is to be applied at the element, wherein the signal is associated with a first activity; and responsive to determining that the current polarity asso-
ciated with the element does not correspond to the
initial polarity associated with the element, invert the
signal applied to the element, wherein the inverted
signal is associated with a second activity that is
inverted from the first activity.

18. The non-transitory computer readable medium of
claim 17, wherein the element is a hierarchical pin.

19. The non-transitory computer readable medium of
claim 17, wherein to determine the initial polarity associated with
the element, the processor is to:
determine a respective initial polarity associated with
each element of the integrated circuit design, and
store an indication of each determined initial polarity at
a memory associated with the integrated circuit
design;
and wherein to determine the current polarity associated
with the element, the processor is to:
determine a respective current polarity associated with
each element of the integrated circuit design, and
store each determined current polarity at the memory.

20. The non-transitory computer readable medium of
claim 19, wherein the processor is further to:
identify each element of the integrated circuit design
based on a synthesized netlist associated with the
integrated circuit design.

\*　\*　\*　\*　\*